United States Patent
Akimoto

(10) Patent No.: US 6,608,694 B1
(45) Date of Patent: Aug. 19, 2003

(54) COMMUNICATION TERMINAL APPARATUS, INTERNET FACSIMILE APPARATUS, AND E-MAIL RECEIVING METHOD

(75) Inventor: Masao Akimoto, Kunitachi (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 09/325,413

(22) Filed: Jun. 4, 1999

(30) Foreign Application Priority Data

Jan. 29, 1999 (JP) .......................................... 11-022433

(51) Int. Cl.[7] .............................................. G06F 13/02
(52) U.S. Cl. ...................... 358/1.15; 358/402; 358/404; 358/407
(58) Field of Search ............................... 358/1.15, 402, 358/442, 1.1, 1.12, 1.13, 1.14, 404, 407, 468

(56) References Cited

U.S. PATENT DOCUMENTS

| | | | |
|---|---|---|---|
| 5,754,778 A | * | 5/1998 | Shoujima .................... 709/206 |
| 5,881,233 A | | 3/1999 | Toyoda et al. ............... 358/402 |
| 6,219,150 B1 | * | 4/2001 | Eguchi ....................... 358/1.14 |
| 2002/0004837 A1 | * | 1/2002 | Ishiguri ...................... 709/231 |

* cited by examiner

Primary Examiner—Mark Wallerson
(74) Attorney, Agent, or Firm—Greenblum & Bernstein, P.L.C.

(57) ABSTRACT

In an internet facsimile apparatus, a mail header receiving section receives a list n-th mail header portion of e-mail. Next, a header analyzing section analyzes the mail header portion and checks whether or not the e-mail is fragments of the e-mail obtained by dividing the e-mail. A table generating section registers the fragments in processing into a table. Thereafter, the fetching determination section checks whether or not the all fragments having the same ID are prepared. If all fragments are prepared, a data receiving section reads the fragments from a mail server sequentially from the first. Text codes of attached files included in the fragments are binary converted sequentially so as to be stored in a buffer section. A printing determination section instructs a print processing section to execute printing when there is image data corresponding to one page of an original in the buffer. This makes it possible to receive a division mail at low cost in the internet facsimile apparatus.

9 Claims, 6 Drawing Sheets

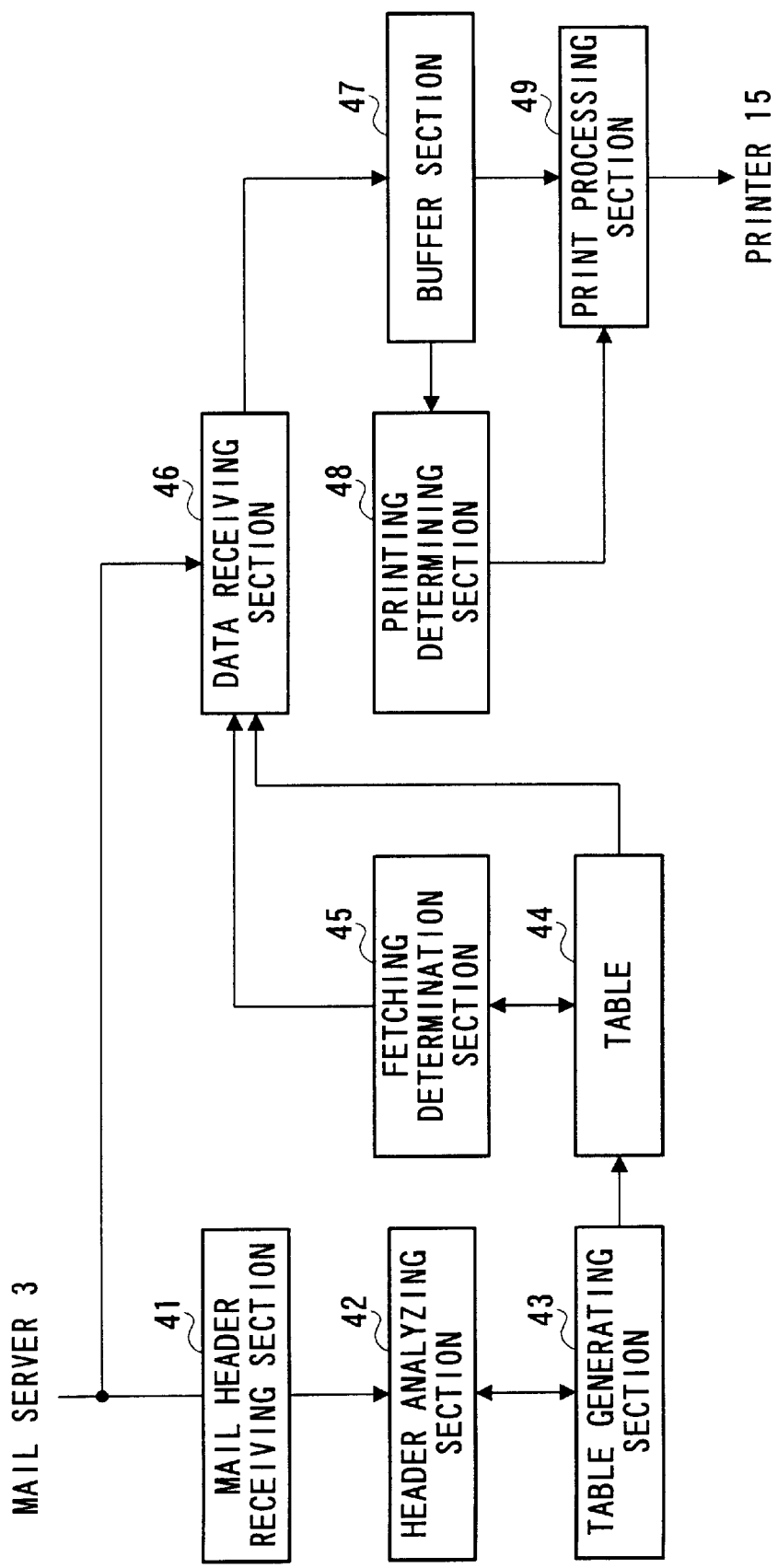
F I G. 4

MASSAGE DIVIDED INTO
TWO FRAGMENTS

— FIRST FRAGMENT 

```
From:xxx@xxx.xxx.xxx
To:xxx@xxx.xxx.xxx
Date:..........
Subject:......
MIME-Version: 1.0
Content-Type:message/partial; id="foo@hoge"; number=1; total=2

Subject:......
MIME-Version: 1.0
Content-Type: image/tiff
Content-transfer-encoding: base64

(FIRST HALF OF DATA)
```

— SECOND FRAGMENT 

```
From:xxx@xxx.xxx.xxx
To:xxx@xxx.xxx.xxx
Date:..........
Subject:......
MIME-Version: 1.0
Content-Type: message/partial; id="foo@hoge"; number=2; total=2

(SECOND HALF OF DATA)
```

FIG. 5

COMMUNICATION TERMINAL APPARATUS, INTERNET FACSIMILE APPARATUS, AND E-MAIL RECEIVING METHOD

BACKGROUND OF THE INVENTION

1. Field of the Invention

The present invention relates to a communication terminal apparatus, an internet facsimile apparatus, and an e-mail receiving method.

2. Description of the Related Art

A mailer is an application that receives and transmits an e-mail, which is executed by a general personal computer (hereinafter referred to as PC). In a certain kind of mailer, if an e-mail having a large data volume is transmitted, the e-mail is divided into a plurality of e-mails (hereinafter referred to as fragments) so as to reduce each data volume. A mailer, which is executed by a recipient's PC, reads all fragments from a server into a main storing device of PC or an external storing device. Then, when all fragments are prepared, these fragments are connected to each other to be restored to the original e-mail.

In recent years, there has been a growing trend to increase an amount of network traffics due to advancement of information multimedia and the widespread use of the internet. This results in a decrease in performance of the server and that of the network. In order to solve such a problem, an addition of limitation to the volume of data passing through the server has been carried out. For this reason, the division of e-mail has become increasingly important in carrying out communications of a large amount of data such as images and voices.

On the other hand, there is proposed the so-called internet facsimile apparatus in which image data obtained by scanning an original is received and transmitted as an attached file of the e-mail over the internet. The internet facsimile apparatus has advantages in which the original can be transmitted to PC by a simple operation and the communication cost can be largely reduced by the use of the internet.

However, in the general internet facsimile apparatus, the capacity of the main storing device is relatively small, and the external storing device having a large capacity such as PC is not mounted thereon. Moreover, since the distribution of e-mail on the internet is not always carried out sequentially, there is no guarantee that the fragments are received in order and it is uncertain when all fragments are prepared. For this reason, unlike PC, in the internet facsimile apparatus, it is difficult to connect the fragments to each other after many fragments are once stored in the memory and all fragments are prepared. Conventionally, in the internet facsimile apparatus, if the fragments are on the server, these fragments are left as they are on the server without reading. Then, the internet facsimile apparatus displays an error message in which the reception is impossible on the display or prints out the message every fragment. Then, an operator must read these fragments using the mailer of PC in accordance with the error message and connect them.

SUMMARY OF THE INVENTION

A first object of the present invention is to provide a communication terminal apparatus, which is capable of receiving a division mail at low cost.

A second object of the present invention is to provide the internet facsimile apparatus, which is capable of receiving a division mail at low cost.

A third object of the present invention is to provide an e-mail receiving method, which is capable of receiving a division mail at low cost.

The above objects are achieved by a communication terminal apparatus having: a fragment identifying section identifies whether or not an e-mail stored in a mail server is e-mail fragments; a determining section determines whether or not the all e-mail fragments are stored in the mail server; and an e-mail receiving section receives the e-mail fragments when the determining section determines that the all e-mail fragments are stored in the mail server.

The above objects are archived by an internet facsimile apparatus having: a fragment identifying section identifies whether or not an e-mail stored in a mail server is e-mail fragments; a determining section determines whether or not the all e-mail fragments are stored in the mail server; and an e-mail receiving section receives said e-mail fragments when the determining section determines that the all e-mail fragments are stored in the mail server.

The above objects are archived by a method for receiving an e-mail having: identifying whether or not an e-mail stored in a mail server is e-mail fragments; determining whether or not the all e-mail fragments are stored in the mail server; and receiving the e-mail fragments when said determining section determines that the all e-mail fragments are stored in the mail server.

According to the present invention, a division mail on a server is recognized, fragments are left on the server until all fragments are prepared. Then, if all fragments are prepared, the fragments are read sequentially and the contents thereof are sequentially output. This makes it possible to receive the division mail by the communication terminal apparatus having a small capacity. As a result, the manufacturing cost of the communication terminal apparatus can be reduced.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 4 is a block diagram showing an e-mail reception processing section of the internet facsimile apparatus according to the embodiment of the present invention;

FIG. 5 is a view showing one example of e-mail fragments handled by the internet facsimile apparatus according to the embodiment of the present invention;

DETAILED DESCRIPTION OF THE PREFERRED EMBODIMENTS

An embodiment of the present invention will now be explained with reference to the accompanying drawings.

Figure 1:
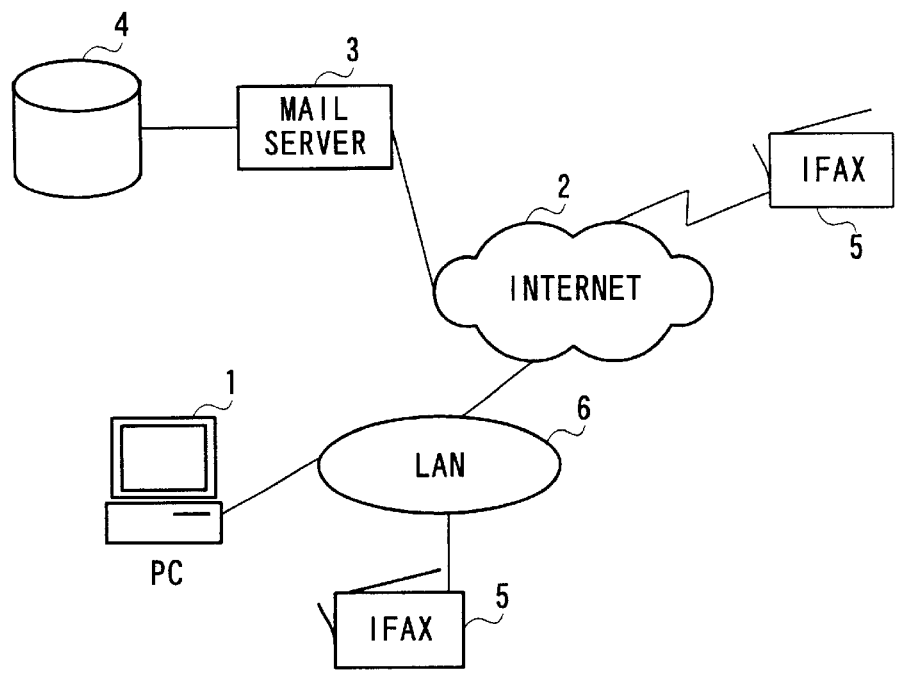
FIG. 1 is a conceptual view of an e-mail communication system.

First of all, a case in which an e-mail is generally received and transmitted through a mail server will be explained with reference to FIG. 1. FIG. 1 is a conceptual view of an e-mail communication system. The e-mail transmitted from PC 1 is stored in a secondary storing device 4 of a mail server 3 provided on an internet 2. An e-mail type facsimile apparatus 5 (internet facsimile apparatus: IFAX), serving as a recipient's terminal, makes an inquiry to the mail server 3. If there is a mail, which is newly arrived, (hereinafter referred to as incoming mail) in the mail box of IFAX 5, IFAX 5 carries out a receiving operation so as to receive the incoming mail from the mail server 3.

The mail server 3 is, for example, a POP (Post Office Protocol) server. The mail server 3 stores e-mails in the secondary storing device 4 in order of arrival. When there is an inquiry from the recipient's terminal, the mail server 3 notifies the total number of incoming mails after authorizing the user. When there is a request of transmission from the recipient's terminal, the mail server 3 transmits the e-mail. Also, when there is a request of deletion, the mail server 3 deletes the email. Such processing is carried out in accordance with, internet-mail transfer protocol such as POP 3.

IFAX 5 is connected to the internet 2 through a local area network (LAN) 6 or by dial-up connection.

Figure 2:
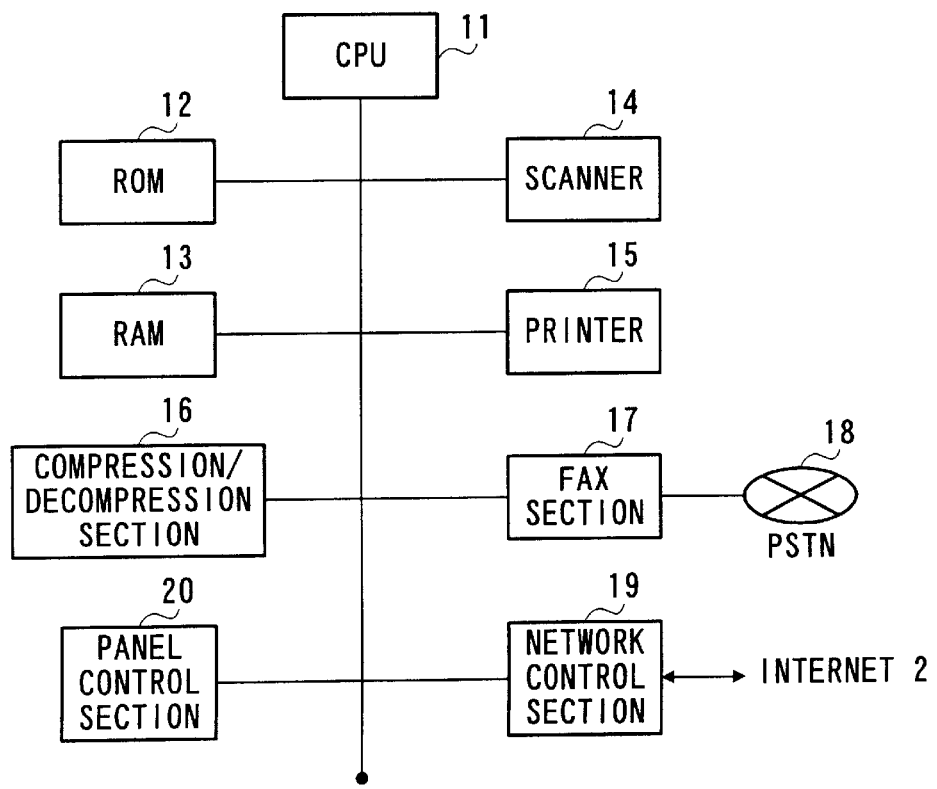
FIG. 2 is a block diagram showing a hardware configuration of the internet facsimile apparatus according to an embodiment of the present invention.

FIG. 2 is a block diagram showing a hardware configuration of the internet facsimile apparatus according to an embodiment of the present invention. CPU 11 executes a program so as to control the entire apparatus. ROM 12 stores the program, which CPU 11 executes.

RAM 13 is a main memory on which the programs are executed. Further, RAM 13 temporarily stores various kinds of data such as e-mails, image files.

A scanner 14 scans an original, and gains image data. A printer 15 prints out image data.

A compression/decompression section 16 compresses raw image data scanned by the scanner 14 to an image file such as an MH file and decompress a received image file. A FAX section 17 receives and transmits data by facsimile communications, and carries out modulation and demodulation when data is received and transmitted on a public switched telephone network (PSTN) 18.

A network control section 19 is an interface for executing the process necessary for receiving and transmitting the e-mail over the internet 2.

A panel control section 20 has dial keys, and a touch panel, and is used on enter operations such as designation of destination, etc. to the IFAX 5. Specifically, the panel control section 20 has a start button which is assigned to a designation of transmission start.

As described above, the internet facsimile apparatus of the present embodiment doesn't have an external data storage device (secondary data storage device) such as Hard disk drive (HDD).

Figure 3:
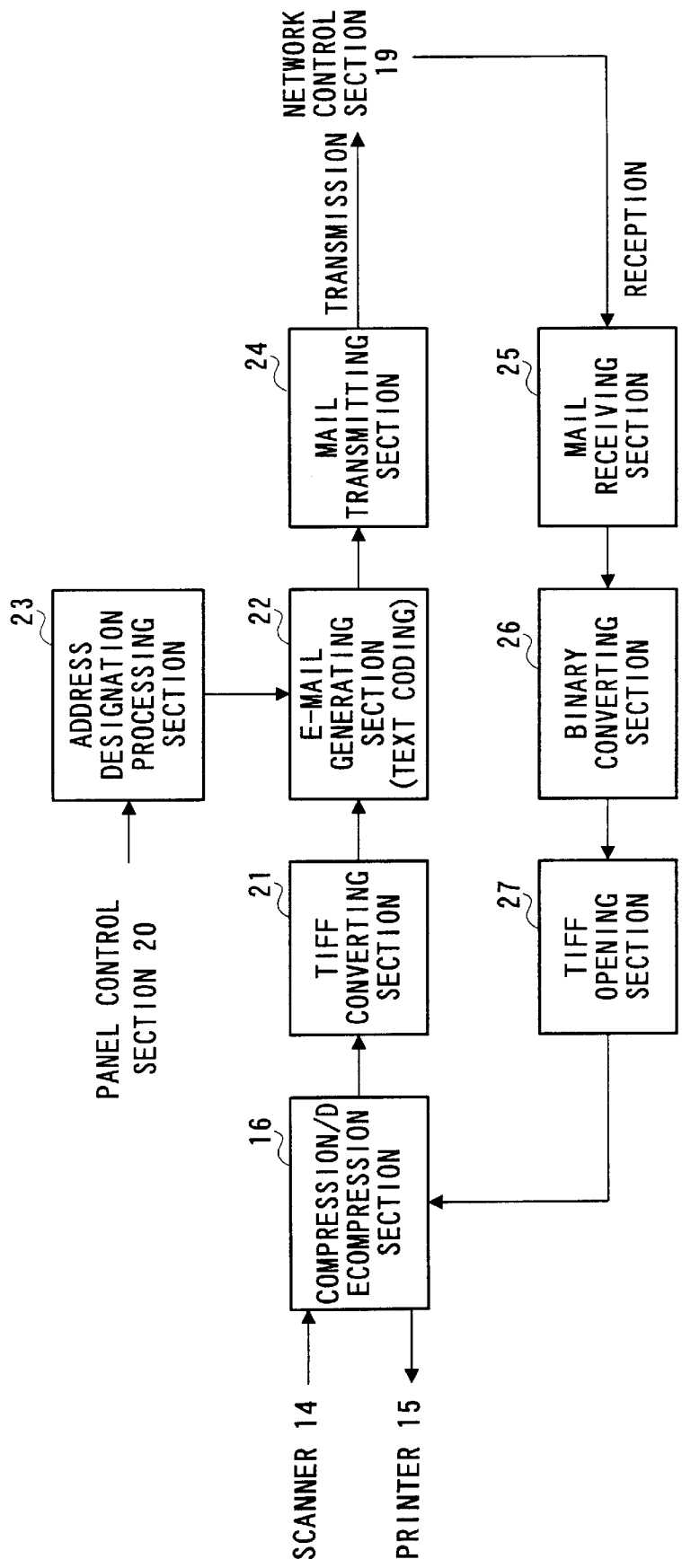
FIG. 3 is a block diagram showing a function of an image communication section of the internet facsimile apparatus according to the embodiment of the present invention.

FIG. 3 is a block diagram showing a function of an image communication section of the above-configured internet facsimile apparatus. In the IFAX 5, at a transmitting time, when the start button is pressed by an operator, the scanner 14 begins to scan originals to gain a raw image data. The raw image data is compressed to compressed data by the compression/decompression section 16. Then, compressed data is converted to a TIFF file by a TIFF converting section 21. A plurality of compressed data corresponding to one page of the original is stored in TIFF file. The TIFF file which the internet facsimile apparatus can support in general is defined by RFC 2301 "File Format for internet FAX" issued by IETF (Internet Engineering Task Force). A recipient's address of the e-mail is send from an address designation processing section 23 to an e-mail generating section 22 upon an input from the panel control section 20. Next, the e-mail generating section 22 generates an e-mail including a ITFF file as an attached file. In other words, the TIFF file is text-coded and added in to a data section of an e-mail in accordance with such as MIME (Multipurpose internet Mail Extensions). Thereafter, a mail transmitting section 24 transmits the e-mail to the mail server 3 through the network control section 19.

While, at a receiving time, the e-mail transmitted by the mail transmitting section 24 is received from the mail server 3. Then, a binary converting section 26 binary converts an attached file portion of the received e-mail to TIFF file from the text code. Thereafter, a TIFF opening section 27 opens the TIFF file. Next, the compression/decompression section 16 decompress compressed data and sends the opened data to the printer 15. The printer 15 prints out an image.

FIG. 4 is a block diagram showing an e-mail reception processing section of the internet facsimile apparatus according to the embodiment of the present invention.

A mail header receiving section 41 reads a mail header portion of the e-mail stored in its receiving folder of the mail server 3 in accordance with a procedure of POP 3.

A header analyzing section 42 analyzes the mail header portion read by the mail header section 41, and determines whether or not the e-mail is a fragment of the division mail. According to MIME standard, which IEFT defines based on RFC, <Content-Type: message/partial>, is described in the mail header portion of the fragment as shown in FIG. 5. Therefore, the header analyzing section 42 identifies the fragment based on whether or not there is such a description. Moreover, the header analyzing section 42 gets an ID common to all fragments from a parameter, <id="ID name">, which is described after the aforementioned description, a number of divisions from a parameter, <total>, and a number of the fragment from a parameter, <number>, respectively.

A table generating section 43 registers a result obtained by the header analyzing section 42 in a table 44. One table 44 is generated with respect to one ID. In the table 44, the number of addresses corresponding to all fragments is prepared in RAM 12 based on the number of divisions. Then, a flag denoting the presence or absence of the incoming mail, a serial number provided to the fragment (hereinafter referred to as fragment number), and a list number of the e-mail in the server 3 are provided to each address.

A fetching determination section 45 checks whether or not a group of fragments having the same ID is prepared with reference to the table 44, and determines whether the group of fragments can be fetched. If it is determined that the group of fragments can be fetched, the fetching determination section 45 instructs a data receiving section 46 to receive the fragments.

The data receiving section 46 requests the mail server 3 to transmit the fragments. The fragments are sequentially received in accordance with the partial number. The received data are temporarily stored in a buffer section 47 of RAM 13. It should be noted that the data receiving section 46 also carries out binary conversion of TIFF file received by text code. This binary conversion is sequentially carried out from the received TIFF file.

A printing determination section 48 analyzes received data stored in the buffer section 47 and instructs a print processing section 49 to execute the printing of image data when receiving printable data, e.g., image data for one page of the original. The print processing section 49 executes the printer 15 to print out an image. In this case, the TIFF header, which has been added to the head of the TIFF file, is used as a boundary between text data and attached file data. Also, an IFD (Image File Directory) added to each of the plurality of image data included in the TIFF file is detected, and these IDFs are used as boundaries of the respective pages of the original.

Figure 6:
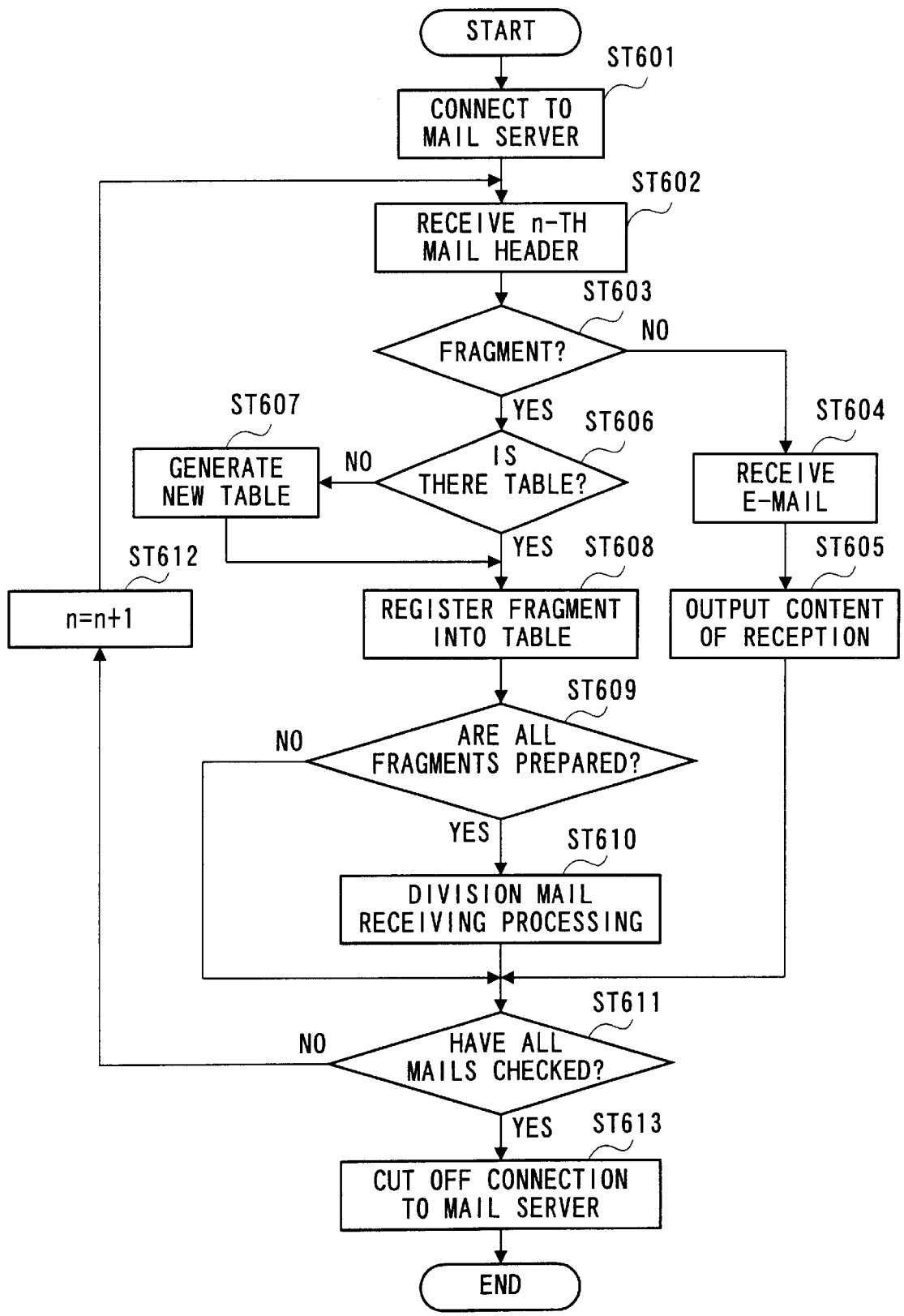
FIG. 6 is a flowchart showing each process of a division mail receiving operation of the internet facsimile apparatus according to the embodiment of the present invention.

The following will explain an operation of the above-configured internet facsimile apparatus. FIG. 6 is a flowchart showing each process of a division mail receiving operation of the internet facsimile apparatus according to the embodiment of the present invention.

The sender's internet facsimile apparatus or the mailer of PC divides the e-mail into a plurality of fragments in a state that a predetermined data capacity is used as one unit, and transmits the fragments to the mail server 3. The mail server 3 stores the received fragments into the recipient's mail box and adds the numbers thereto in order of receiving time so as to generate a list.

The recipient's internet facsimile apparatus requests connection with respect to the mail server 3 in Step (hereinafter referred to as ST) 601. The mail server 3 recognizes an ID and a password, and notifies a total number N of e-mails, which the mail server 3 holds, to the recipient's internet facsimile apparatus.

In ST602, the mail header receiving section 41 receives mail header of the e-mail of n (initial value=1)-th of the list. Next, in ST603, the header analyzing section 42 analyzes the mail header portion to check whether the e-mail is the fragment of the divided e-mail or not.

If the e-mail is not the fragment in ST603, a mail receiving section 25 shown in FIG. 3 receives the e-mail, and deletes the e-mail from the mail server 3 in ST604. Thereafter, in ST605, the content of reception is output, and the operation goes to ST 611 to be described later.

On the other hand, if the e-mail is the fragment in ST603, the table generating section 43 checks whether or not there is the table 44 having the same ID. If there is no table 44, the table generating section 43 newly generates table 44 in ST607. Then, in ST608, the table generating section 43 registers the fragment in processing into the table 44.

Thereafter, in ST609, the fetching determination section 45 checks whether or not all fragments having the same ID are prepared. The fetching determination section 45 determines that all fragments are prepared when flags denoting the arrival of fragments are set at all addresses of the table 44. If all fragments are not prepared, the operation goes to ST 611.

On the other hand, if all fragments are prepared, a division mail receiving processing is carried out in ST610. Thereafter, in ST611, it is checked whether or not all e-mails notified from the mail server 3 have been checked.

If the check of all e-mails is not completed in ST611, an order n of the e-mail to be checked is incremented by one in ST612, and the operation goes back to ST602 so as to check a next E-mail. If the check of all e-mails is completed, the connection to the mail server 3 is cut off in ST613.

In the aforementioned operation, when all fragments are not prepared in the mail server 3, the connection to the mail server 3 is cut off as the fragments are left in the mail server 3. If the connection to the mail server 3 is cut off, the table 44 is all erased.

Figure 7:
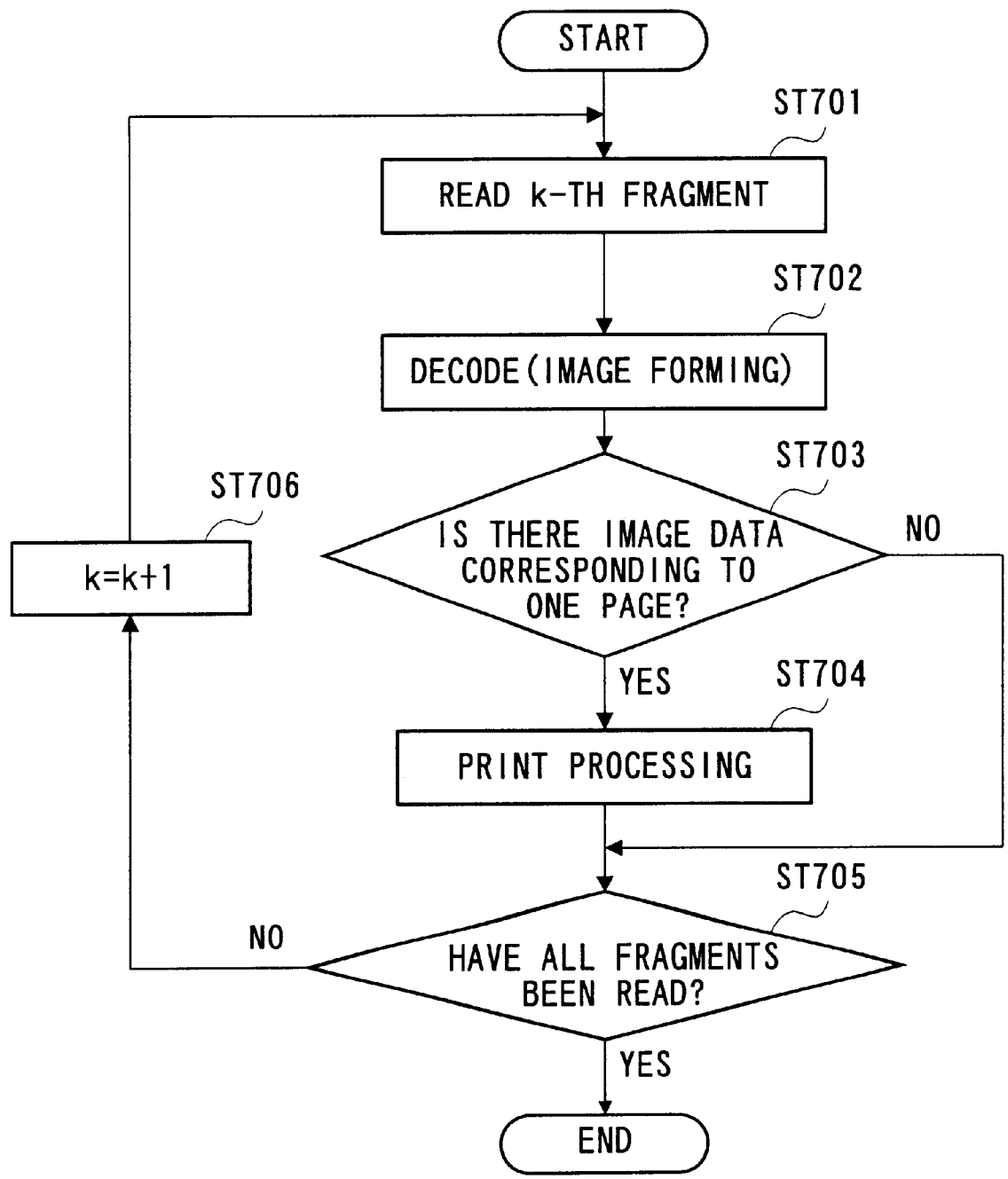
FIG. 7 is a flowchart showing each process of receiving processing of the division mail of the internet facsimile apparatus according to the embodiment of the present invention.

Next, the following will specifically explain the receiving processing of the division mail. FIG. 7 is a flowchart showing each process of receiving processing of the division mail of the internet facsimile apparatus according to the above-explained embodiment.

In ST701, the data receiving section 46 reads k (initial value=1)-th fragment from the mail server 3. In ST702, the text codes of the attached files included in the fragments are sequentially binary converted and stored in the buffer section 47.

In ST703, the printing determination section 48 checks whether or not there is image data corresponding to one page of the original in the buffer section 47. If there is image data corresponding to one page of the original in ST703, the printing determination section 48 instructs the print processing section 49 to execute the printing. The print processing section 49 sends image data corresponding to one page of the original to the printer 15. The printed fragment is erased from the buffer section 47.

In ST705, the data receiving section 46 checks whether or not all fragments have been read. In this check, it is determined whether or not an order k of the current fragment is equal to the number of divisions. If it is determined that all fragments have not been read in ST705, a value k is incremented by one and the operation goes back to ST701 to read a next fragment. If it is determined that all fragments have been read in ST705, the operation goes to ST611 shown in FIG. 6.

In the above-configured internet facsimile apparatus according to the above-explained embodiment, the header analyzing section 42 identifies whether or not the e-mail stored in the mail server 3 is the fragment, and registers the fragment having the same ID in the table 44. Then, the fetching determination section 45 determines whether or not all fragments are prepared in the table 44. If all fragments are prepared, the data receiving section 46 receives the fragments. This eliminates the need for storing the received fragments in RAM 13 until all fragments are prepared. As a result, at the time of receiving the division mail, the internet facsimile apparatus may have the small-sized capacity of RAM 13 and there is no need of connecting an external data storage device such as HDD. This makes it possible to reduce the product cost.

Also, according to the above embodiment, Receiving the mail header portion from the mail server 3 by the mail header receiving section 41 allows recognition of the fragment and grasping the total number of fragments. Thereby, it possible to further reduce the memory capacity of the internet facsimile apparatus and further decrease the product cost.

Moreover, the data receiving section 46 sequentially receives the fragments in accordance with the partial number shown by the parameter <number>, and prints out them. In other words, the internet facsimile apparatus according to the above-mentioned embodiment prints out the fragments as being connected to each other sequentially in accordance with the order in which the e-mail is divided. As a result, the size of buffer portion 47 may be small as compared with a case in which all fragments are stored, connected, and output. Thereby, it possible to reduce the memory capacity of the internet facsimile apparatus, so that the product cost can be reduced.

The present invention is not limited to the above-mentioned embodiment. For example, in the above-explained embodiment, the mail server 3 distributed the mail in accordance with POP3. However, the present invention can be applied to the e-mail protocols other than POP3.

Further, in the aforementioned embodiment, the facsimile apparatus was explained as a communication terminal.

However, the scope of the present invention includes the other image communication apparatus. For example, the present invention also includes a network scanner having a network communication interface, and a network copy machine. Moreover, the present invention includes a multi function printer combining a scanner, a printer, a copy machine, a facsimile apparatus, etc.

Furthermore, the present invention includes a computer-readable storage medium having a program code causing a computer to execute the same processing as that of the facsimile apparatus according to the aforementioned embodiment.

The present invention is not limited to the above described embodiments, and various variations and modifications may be possible without departing from the scope of the present invention.

This application is based on the Japanese Patent Application No.HEI 11-22433 filed on Jan. 29, 1999, entire content of which is expressly incorporated by reference herein.

What is claimed is:

1. A communication apparatus capable of connecting to a mail server that stores an e-mail message transmitted from a sender, the communication apparatus comprising:

a first requestor that requests the mail server to connect to the communication apparatus;

a fragment identifier that identifies whether or not the e-mail message stored in the mail server comprises e-mail message fragments;

a determiner that determines whether an entirety of the e-mail message fragments corresponding to a complete e-mail message is stored in the mail server when said fragment identifier identifies the stored e-mail message comprises e-mail message fragments;

a second requestor that requests the mail server to cut off a connection to the mail server when said determiner determines that the entirety of e-mail message fragments is not stored in the mail server; and an e-mail receiver that receives the e-mail message fragments when said determiner determines that the entirety of e-mail message fragments are stored in the mail server.

2. The communication apparatus according to claim 1, further comprising:

a mail header receiver that receives a mail header portion of the e-mail message from the mail server after the communication apparatus is connected to the mail server by said first requestor; and a mail header analyzer that analyzes the received mail header portion, and detects a fragment parameter indicating that the stored e-mail message in the mail server is e-mail message fragments, wherein said fragment identifier identifies that the stored e-mail message in the mail server is fragments when said mail header analyzer detects the fragment parameter.

3. The communication apparatus according to claim 2, wherein:

the fragment parameter that corresponds to a total number indicating the total number of e-mail message fragments included in the mail header portion of the e-mail message is detected by said mail header analyzer; and said determiner determines whether the entirety of the e-mail message fragments corresponding to the complete e-mail message is stored in the mail server in accordance with the total number of e-mail message fragments shown by the parameter.

4. The communication apparatus according to claim 1, further comprising:

a converter that converts the received e-mail message fragments into printable image data; and a printer configured to print the converted printable image data.

5. The communication apparatus according to claim 4, wherein said printer is configured to start printing the printable image data after said converter finishes converting the e-mail message fragments of one page of the printable image data.

6. A method for receiving e-mail, using a communication apparatus capable of connecting to a mail server that stores an e-mail message transmitted from a sender, the method comprising:

requesting the mail server to connect to the communication apparatus;

identifying whether or not the e-mail message stored in the mail server is e-mail message fragments;

determining whether an entirety of the e-mail message fragments corresponding to a complete e-mail message is stored in the mail server when the stored e-mail message is identified as e-mail message fragments;

requesting the mail server to cut off a connection to the mail server when the determining determines that the entirety of e-mail message fragments is not stored in the mail server; and receiving the e-mail message fragments when the determining determines that the entirety of e-mail message fragments are stored in the mail server.

7. The method according to claim 6, further comprising:

receiving a mail header portion of the e-mail message from the mail server after the communication apparatus is connected to the mail server; and analyzing the received mail header portion, and detecting a fragment parameter indicating that the stored e-mail in the mail server is e-mail message fragments, wherein the identifying identifies that the stored e-mail message in the mail server is fragments when the fragment parameter is detected.

8. The method according to claim 7, wherein:

the fragments parameter that corresponds to a total number showing the total number of e-mail message fragments included in the mail header portion of the e-mail message is detected; and the determining determines whether the entirety of the e-mail message fragments corresponding to the complete e-mail message is stored in the mail server in accordance with the total number of e-mail message fragments shown by the parameter.

9. The method according to claim 6, further comprising:

converting the received e-mail fragments into printable image data; and printing the converted printable image data.

* * * * *